United States Patent [19]

Ferguson

[11] Patent Number: 5,801,700

[45] Date of Patent: Sep. 1, 1998

[54] SYSTEM AND METHOD FOR AN ICONIC DRAG AND DROP INTERFACE FOR ELECTRONIC FILE TRANSFER

[75] Inventor: Gregory J. Ferguson, Hunt Valley, Md.

[73] Assignee: Silicon Graphics Incorporated, Mountain View, Calif.

[21] Appl. No.: 588,844

[22] Filed: Jan. 19, 1996

[51] Int. Cl.$^6$ .................................................. G06F 15/00
[52] U.S. Cl. .................. 345/349; 345/357; 345/200.12; 345/200.15
[58] Field of Search ........................ 395/326, 347, 395/348, 349, 356, 357, 601, 610, 200.12–200.17; 345/326, 347, 348, 349, 356, 357; 707/1, 10

[56] References Cited

U.S. PATENT DOCUMENTS

| | | | |
|---|---|---|---|
| 5,416,901 | 5/1995 | Torres | 395/159 |
| 5,490,244 | 2/1996 | Isensee et al. | 395/159 |
| 5,491,784 | 2/1996 | Douglas et al. | 395/159 |
| 5,500,929 | 3/1996 | Dickinson | 345/356 |
| 5,564,018 | 10/1996 | Flores et al. | 395/200.02 |
| 5,572,643 | 11/1996 | Judson | 395/200.48 |
| 5,579,481 | 11/1996 | Drerup | 345/179 |
| 5,621,878 | 4/1997 | Owens et al. | 395/326 |
| 5,649,186 | 7/1997 | Ferguson | 395/610 |
| 5,657,390 | 8/1997 | Elgamal et al. | 380/49 |

OTHER PUBLICATIONS

Norr, H., "Snatcher 1.0", MacWeek, v9, n11, p28(2), Mar. 13, 1995.

Lau, T., "Building a Hypermedia Information System on the Internet", Professional Communication Conference, 1994, pp. 192–197.

FTP-32 Client for Windows©, Copyright ©1993–1995 John A. Junod, Copyright ©1994–1995 Ipswitch, Inc. and associated screen printouts.

Boyce et al., *Understanding Windows 95*, New Riders Publishing, Indianapolis, ©1994, pp. 63–65 and 127–128.

*Primary Examiner*—John E. Breene
*Assistant Examiner*—U. Chauhan
*Attorney, Agent, or Firm*—Sterne, Kessler, Goldstein & Fox P.L.L.C.

[57] ABSTRACT

A system and method for transferring files from a sending user to a recipient, utilizes a drag-and-drop graphical user interface. To send a file to a recipient, the user drags and drops onto the recipient's icon an icon, or set of selected icons, representing the file(s) to be transmitted. Information pertaining to the file and the recipient is captured from the icons and used to establish a session between the sender and the recipient. The file is transferred to the recipient via the established session.

30 Claims, 4 Drawing Sheets

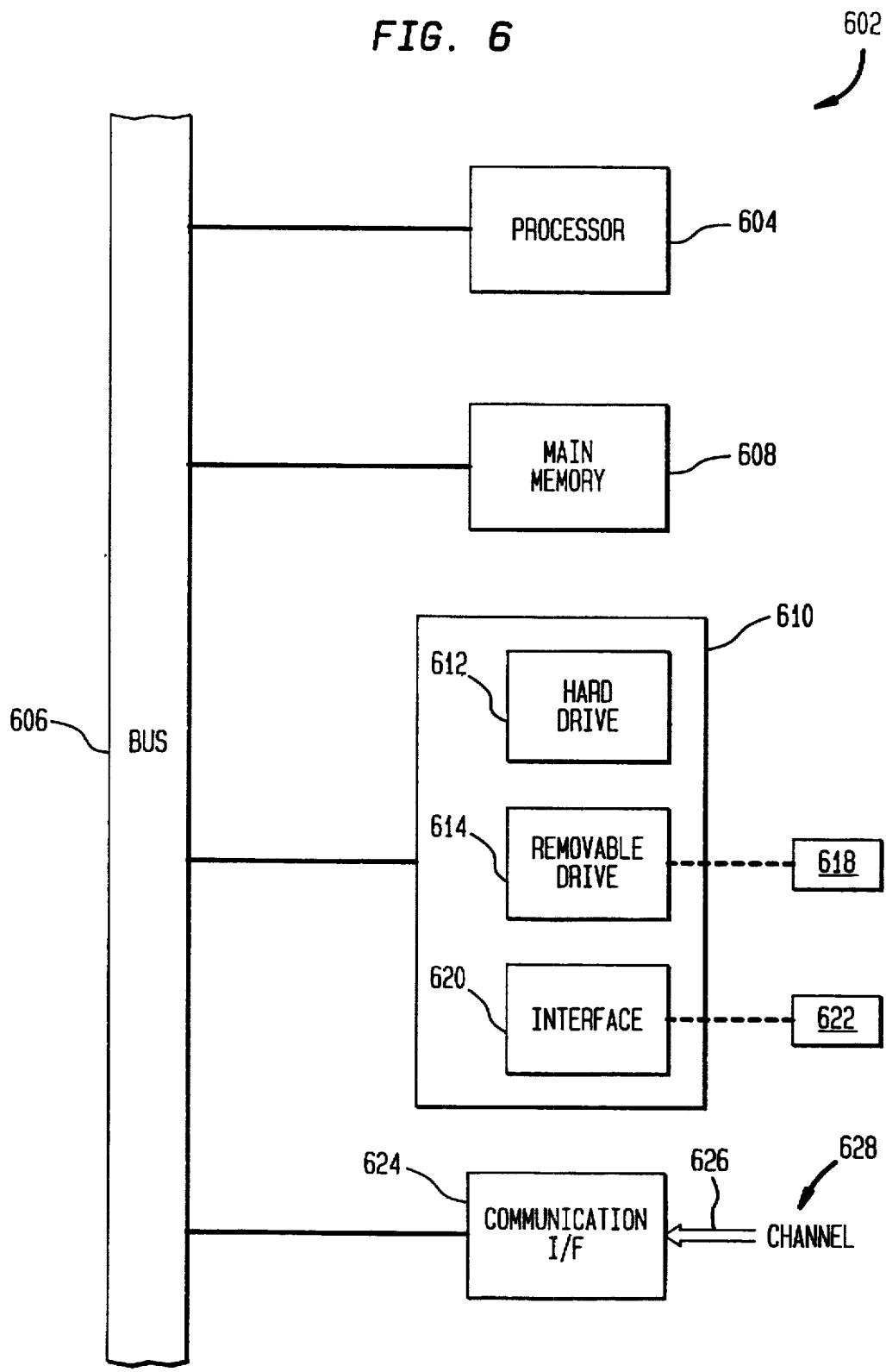

SYSTEM AND METHOD FOR AN ICONIC DRAG AND DROP INTERFACE FOR ELECTRONIC FILE TRANSFER

BACKGROUND OF THE INVENTION

1. Field of the Invention

This invention relates generally to graphical user interfaces and file transfers. More particularly, the invention relates to a system and method for a drag and drop iconic interface allowing simplified file transfer.

2. Related Art

A vast array of electronic information infrastructures are rapidly being assembled and used by business and industry to facilitate the exchange of information and data across both near and far distances. As available computing power at a given price point is increasing, personal computers, workstations and other computing devices are finding their way onto more desktops, into more offices, and into more working environments than ever before imagined. These computing devices are used as the links into the information infrastructure, allowing all forms of electronic communications and data exchange.

This rise of electronic communication is a world-wide phenomenon, globally affecting all facets of business and industry. Be it a local area network linking a few computers together in close proximity, or a wide area network providing information exchange around the globe, more and more businesses and individuals are turning to communications and data exchange via this electronic infrastructure. The electronic information infrastructure is reaching business operations from manufacturing and production to research and development, sales and commerce.

As a result of this exploding popularity of the electronic information infrastructure, electronic communications and file transfers are not limited to those occurring between technically-oriented people. Instead, people with varying backgrounds and varying amounts of technical prowess are turning to networking and electronic communication. To accommodate the users with little or no technical expertise, there is a growing need for more efficient, intuitive and user friendly interfaces for managing network collaboration and electronic communications.

With many current desktop environments, users can manipulate files by clicking on and dragging icons across the desktop. For example, to open a file, in one environment, the user simply double clicks on the icon representing that file and the file opens. In some environments, an associated application, such as a word processing application, is automatically opened if necessary. As another example, to delete a file, the user may drag the icon representing the file over an icon representing a dumpster or a trash can and drop the icon representing the file onto the icon representing the trash receptacle.

This iconic graphical user interface provides the user with a user friendly and intuitive interface that is easy to use, even for non-technical users. The click, drag and drop features of this interface, however, have traditionally been confined to simple file operations within the domain of the desktop. More complex operations require several steps to complete and sometimes even require the entry of information by the user. In these situations, the intuitive aspect of the interface is lost and a higher degree of user knowledge is required to perform the desired operations. One such situation which requires the user to perform a series of steps is file transfer operations.

In some recently-released applications, a user is permitted to drag an icon and drop it onto another icon representing a recipient. In this application, the file represented by the dropped icon is sent as an e-mail attachment to an e-mail message which is sent to the recipient.

SUMMARY OF THE INVENTION

The present invention is directed toward a system and method for transferring files from a sending user to a recipient, utilizing a drag-and-drop graphical user interface. According to the invention, when a user wishes to send a file to a recipient, the user simply drags and drops onto the recipient's icon an icon, or set of selected icons, representing the file(s) to be transmitted. The invention captures information from the icons and transfers the file to the recipient.

In one embodiment, the file is transferred using the File Transfer Protocol (FTP). In this embodiment, the invention contacts the recipient, establishes an FTP connection and transfers the file using FTP. The transfer occurs automatically, without the need for the sending user to enter additional commands or follow numerous steps.

In one embodiment, when a file icon is dropped on a recipient's icon a pop-up window is opened and displays the information captured from the icons. This information can include the recipient's file transfer address, log-in information and receiving directory. This information can further include an e-mail address for the recipient indicating where to send a notification of the transfer and any comments relating to the transfer. The pop-up window can also include a space for representative icon(s) of the file(s) to be transferred to the recipient. The user can change the selection of which files are to be transferred by editing this space. In other words, the user may remove file icons from this space and additional file icons.

An advantage of the invention is that file transfer operations can be invoked and completed through the graphical user interface, without requiring the sending user to open a shell window and transfer the file using a command language. The transfer can take place using a protocol suited for transferring files, such as the File Transfer Protocol or other suitable file transfer protocol.

A further advantage of the invention is that it can automatically send an e-mail notification to the recipient and/or to an associated person or group of people. The e-mail message can include information indicating the file transfer as well as indicating file transfer statistics, such as: location of the file, size of the file, transfer time, sender identification, and so on. This e-mail message can include comments as well. The comments can be automatically generated or customized by the sending user.

Another advantage of the invention is that it can be integrated with numerous applications, allowing users to transfer files while in those applications. Example applications include rolodex applications, chat room applications, directory applications and others.

Yet another advantage of the invention is that, unlike a technique that sends the file as an e-mail attachment, the invention establishes a communications session between the sender and the recipient. According to the invention, the file is transferred via this session from the sender to the recipient, allowing efficient transfer of the file.

An additional advantage of the invention is that it can provide an indication to the user as to the status of the transfer. This indication can be in the form of a bar graph (sometimes called a "thermometer"), a percent-transferred indicator, a time-to-complete indication, and other like indicators.

Further features and advantages of the present invention, as well as the structure and operation of various embodiments of the present invention, are described in detail below with reference to the accompanying drawings.

BRIEF DESCRIPTION OF THE DRAWINGS

The present invention is described with reference to the accompanying drawings. In the drawings, like reference numbers indicate identical or fuctionally similar elements. Additionally, the left-most digit(s) of a reference number identifies the drawing in which the reference number first appears.

FIG. 6 is a diagram illustrating an example computer system in which the invention is implemented according to one embodiment.

DETAILED DESCRIPTION OF THE EMBODIMENTS

1. Overview and Discussion of the Invention

The present invention is directed toward a system and method for providing an iconic drag and drop interface for file and/or data transfer operations. According to the invention, to transfer a file to a remote location, the sending user simply selects the representative icon for the file (e.g. clicks on the icon with a mouse or other pointing device) and drags the icon over and drops it onto an icon representing the receiving user.

In one embodiment, the file is automatically sent to the receiving user. In an alternative embodiment allowing more complex operations, the system can prompt the sending user for more information such as additional files to be transferred, additional users to receive the file, and other additional information.

The invention is described in this document in terms of transferring a file using the commonly known File Transfer Protocol, or FTP. Description in these terms is provided for illustrative purposes only. After reading this description, it will become apparent to a person skilled in the relevant art how to implement the invention using file transfer protocols other than the File Transfer Protocol. One example of an alternative protocol is the Kermit protocol commonly used in the DOS environment for transferring files.

Throughout this document the term "icon" is used to describe an image representing a file, a user, a directory, a program, or other attribute or object of the computing environment. The icon can be text, a two-dimensional or three-dimensional image or other symbol representing an object.

2. Example Environment

Figure 1:
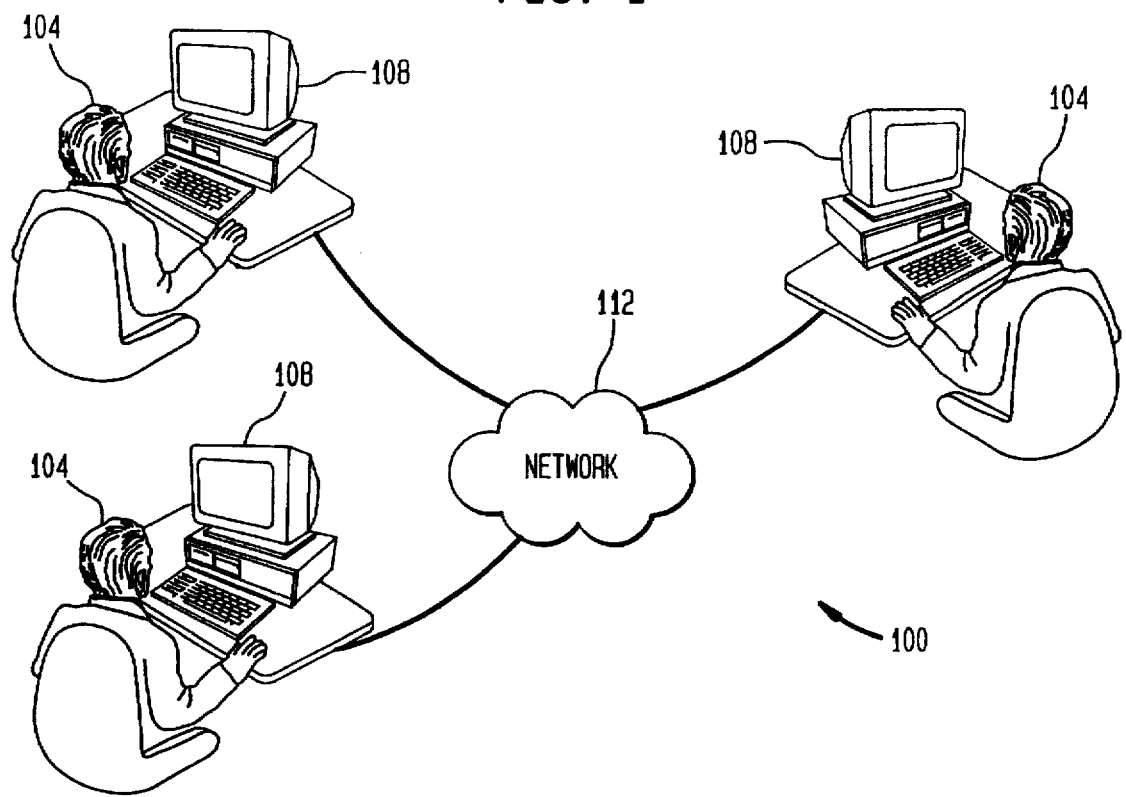
FIG. 1 is a diagram illustrating an example environment of the invention.

Before describing the invention in detail, it is useful to describe an example environment of the invention. FIG. 1 is a block diagram illustrating an example environment 100. Referring now to FIG. 1, example environment 100 is comprised of several users 104 (three are shown), a network 112 and terminals 108. Users 104 can communicate with one another via a network 112 using their terminals 108. Users 104 can communicate using electronic mail (e-mail), chat rooms or other electronic techniques. An example of network 112 is a wide area network (WAN), such as the Internet. Although the invention can be implemented to facilitate file transfer in numerous different network environments, its features are particularly advantageous in the WAN environment. Examples of terminals 108 can include workstations, personal computers and other like devices.

In this environment 100, users 104 send files to one another across wide area network 112. Users 104 can utilize the present invention to facilitate the transmission of these files. The present invention is described in terms of this example environment 100. Description in these terms is provided for convenience only. It is not intended that the invention be limited to application in this example environment. In fact, after reading the following description, it will become apparent to a person skilled in the relevant art how to implement the invention in alternative environments.

3. Conventional File Transfer

Before describing the invention in detail, it is useful to describe some conventional techniques used to transfer files. Conventional file transfer can be accomplished a number of different ways using conventional techniques. In one conventional technique, the sender simply attaches the subject file to an e-mail message that he or she is sending to the recipient. This technique is commonly employed in many local area network environments such as offices where users wish to exchange small files across short distances. However, in some situations, such as where users wish to transfer large files and especially over large distances, this conventional technique is less than ideal.

To handle the transfer of large files over greater distances, attachment to an e-mail message is not the best method. One reason it may not be desirable to attach a large file to an e-mail message is that the e-mail message may follow a complex routing path requiring the message to travel across several different Links (i.e., the message takes several "hops") before reaching the desired destination. Latencies associated with numerous hops throughout a network are increased as the length of the file (i.e., the amount of data being transferred) increases.

To compensate for these shortcomings one conventional technique uses a specific protocol, known as the File Transfer Protocol (FTP) to transfer large files between users. The File Transfer Protocol allows very quick transfer of files.

Conventionally, to send a file using the File Transfer Protocol, the user had to follow a number of different steps. To illustrate the steps that are typically followed in a conventional transfer using the file transfer protocol, the steps are briefly described in terms of a Unix environment. First, the user needs to open a Unix Shell, or shell window to initiate a session. This is a command-driven interface which does not allow file manipulation using the iconic interface.

Next the user has to know the path (diretory location) and file name for the file he or she wishes to transfer. Users who are used to an iconic interface are not necessarily comfortable with navigating through a directory structure using directory paths. Once the user knows which file he or she is going to send, the user enters the appropriate commands to establish a connection that supports the file transfer protocol. For the case of Internet transfers, this requires that the user enter a full Internet address for the recipient's machine. In most cases, the user is then required to log in and enter a password. Next, the user must enter the command to send the correct file to the recipient. Once this is done, the user enters a command to break the session and the user closes the Unix Shell.

These steps are somewhat easy for a computer-literate user who is used to operating in a command-driven interface. However, for a non-technical user, this process is far from intuitive and can be somewhat daunting.

4. Iconic Drag and Drop Inteface

The iconic drag and drop interface is now described according to several embodiments. In general, if a user 104 wishes to send a file to a recipient (another user 104), the sending user 104 simply drags the icon for the file to be sent and drops that file's icon onto the icon representing the recipient. An application is invoked which establishes an FTP connection with the recipient and transfers the file using FTP. As stated above, after reading this description, it will become apparent to one of ordinary skill in the art how to apply the invention to situations where an alternative protocol is used.

Figure 2:
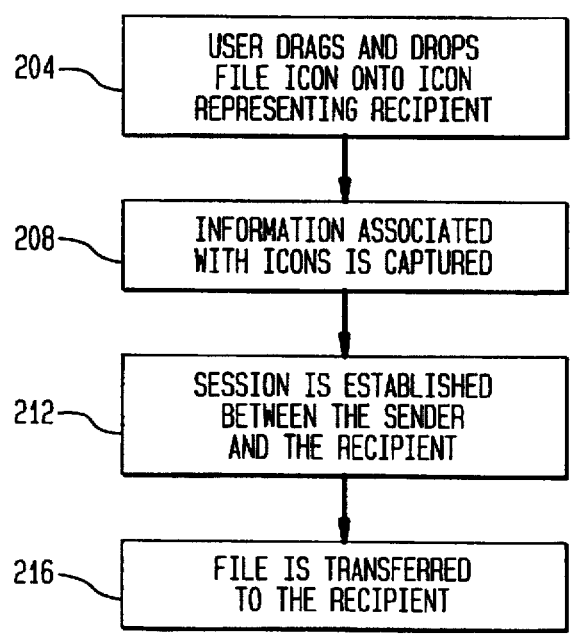
FIG. 2 is an operational flow diagram illustrating a process for sending a file according to one embodiment of the invention.

FIG. 2 is a high-level operational flow diagram illustrating the process according to one embodiment of the invention. In a step 204, a user 104 determines that he or she wishes to send a file to another user (referred to as the recipient). The sending user 104 locates the icon representing that file, drags that icon and drops it onto an icon representing the recipient.

In a step 208 information associated with the recipient's icon and from the file's icon is captured. From this information, the correct file to be transferred and its location are determined as are the recipient's location and/or address. From the file's icon, information such as file name and directory location can be determined. Where the transfer is an FTP transfer, the information determined from the recipient's icon can include an FTP address of the recipient and an FTP log-in for the recipient. The recipient's information can also include an e-mail address of the recipient so that the recipient can receive notification of the file transfer (before, after or during the transfer) as well as any comments regarding the transfer.

In a step 212, an FTP session is initiated with the recipient and the designated file is sent to the recipient using the information determined above in step 208. Specifically, according to one embodiment of the invention, the system uses the recipient's FTP address and log-in information to contact the recipient and establish an FTP session with the recipient.

Once the log-in is successful, in a step 216 a transfer of the file from the sender to the recipient is accomplished using a transfer protocol such as the File Transfer Protocol. Thus, the file can be transferred using the File Transfer Protocol in the environment of the iconic graphical user interface without the need to open a shell window and enter difficult to remember commands.

Figure 3:
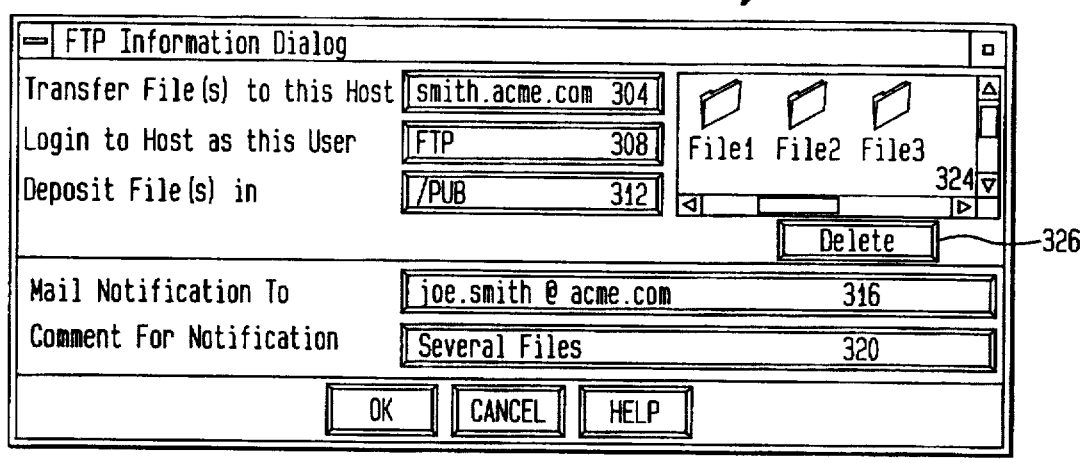
FIG. 3 is a diagram illustrating an example pop-up window according to one embodiment of the present invention.

In one embodiment, step 208 of capturing recipient and file information is enhanced to provide the user 104 with additional flexibility. In one embodiment, this is accomplished by presenting the user 104 with one or more pop-up windows that allow the user to update or modify certain parameters and fields. FIG. 3 is a diagram illustrating an example of one such pop-up window 300. Window 300 has several fields containing information relating to the file transfer. In the example illustrated in FIG. 3, these fields include a destination field 304, a log-in field 308, a deposit field 312, a notification field 316, a comments field 320 and a file area 324.

Destination field 304 contains the address of the recipient of the file. For an application where the file is to be transferred using the file transfer protocol, this address is the FTP address of the recipient. Log-in field 308 indicates the type of log-in the application will make to the recipient in transferring the file. In the example illustrated in FIG. 3, the log-in type specified is an FTP log-in, indicating that the log-in to the recipient will be a file transfer protocol log-in.

Deposit field 312 is a field that allows the sending user 104 to specify a directory in the recipient's file space where the transferred file is to be stored. In one embodiment, the directory specified is a directory relative to the initial directory of the log-in. The recipient can establish such a directory in his or her directory space and designate this directory for file transfers to his or her machine. Directory information indicating this directory can be associated with the recipient's icon.

In one embodiment, the application automatically sends an e-mail message to the recipient to notify the recipient that a file is being transferred to him or her. In this embodiment, notification field 316 indicates the e-mail address of the recipient to which such notification is to be sent. Comments field 320 provides an input space for the sender to provide comments to be included in the e-mail notification. In one embodiment, a default message is provided in comments field 320 indicating that files are being transferred to the recipient. In one embodiment, this message automatically captures the file name(s) of the file(s) being transferred and provides this information in the e-mail notification message sent to the recipient.

File area 324 is an area displaying the icon of the file selected for transfer. In one embodiment, sending user 104 can select additional files to be transferred to the recipient by dragging and dropping icons for those additional files onto file area 324. Sending user 104 can also delete files from the list (i.e., designate one or more files to be excluded from the transfer) by selecting an icon and clicking delete button 326.

In one embodiment, fields 304, 308, 312, 316, 320 and 324 are automatically filled in using the information associated with the recipient's and the file's icons. This greatly simplifies the task of sending a file to a recipient using FTP. If sending user 104 wishes to change any information in any or all of fields 304, 308, 312, 316, 320 and 324, sending user 104 may do so by editing the desired field. This embodiment provides sending user 104 with flexibility in changing the transfer parameters using the graphical user interface. Thus, sending user 104 can customize the transfer operations without having to know or use the underlying command language.

In one embodiment, the invention provides an indication of the status of the transfer to sending user 104. This indication can be in the form of a bar graph (sometimes called a "thermometer"), a percent-transferred indicator, a time-to-complete indication, and other like indicators.

5. Example Application

The invention can be used in conjunction with any of a number of different applications running on terminal 108, and is not limited to a particular one or more applications. This section of the document describes a few example applications with which the invention can be implemented. This description is intended to provide a better understanding of the invention and its possible applications, and not to limit the invention to these applications.

In one example, the file icon can be dragged and dropped onto a desktop "rolodex" application, causing the file to be transferred to the recipient on whose rolodex card the file icon was dropped. In one embodiment of this example, the rolodex card for the recipient is the recipient's icon and has associated with it the information used to transfer the file to the recipient.

In another example, the invention can be used in a chat room environment. Chat rooms or other such applications are often utilized by users 104 to communicate and exchange ideas and files on-line and in real-time in private or public virtual meeting rooms. The invention can be used in this environment to transfer files among users 104 in the chat room by allowing a sender to drag and drop a file icon onto the recipient's icon in the chat room.

Figure 4:
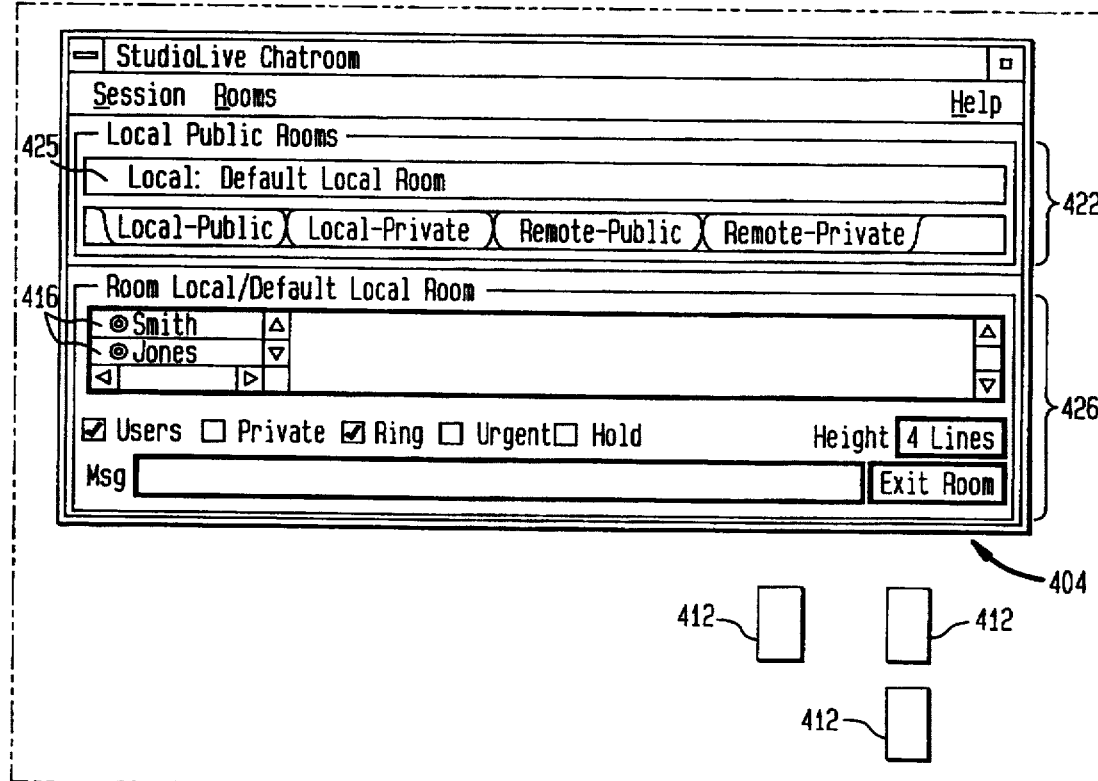
FIG. 4 is a diagram illustrating an example desktop and chat room application.

FIG. 4 is a diagram illustrating a desktop 400 having an example chat room window 404 where a user 104 may transfer a large file by dragging and dropping an icon 412 representing the file onto an icon 416 representing the desired recipient. The example illustrated in FIG. 4 illustrates a chat room window 404 and a plurality of file icons 412 on the desktop 400.

Chat room window 404 as illustrated in FIG. 4 includes two sections: a room-selection portion 422 and a selected-room portion 426. Room-selection portion 422 accepts input from user 104, allowing him or her to select a chat room. In the example illustrated in FIG. 4, user 104 can select a chat room from rooms available in four categories: Local-Public, Local-Private, Remote-Public, and Remote-Private. Window area 424 provides user 104 with a list of rooms available in the selected category. Room icons 425 (one illustrated in FIG. 4) indicate to user 104 which rooms are available in the selected category.

Selected room portion 426 provides information pertaining to the chat room selected and the other users 104 also participating in that chat room. Selected room portion 426 includes an area listing icons 416 representing the users 104 connected to the selected chat room. When a user 104 wishes to send a file to one of the other users 104 connected to the chat room, the sending user selects an icon 412 representing the file. The sending user drags that icon 412 and drops it onto icon 416 representing the recipient. This invokes the invention which causes the file to be sent to the recipient using the file transfer protocol.

Figure 5:
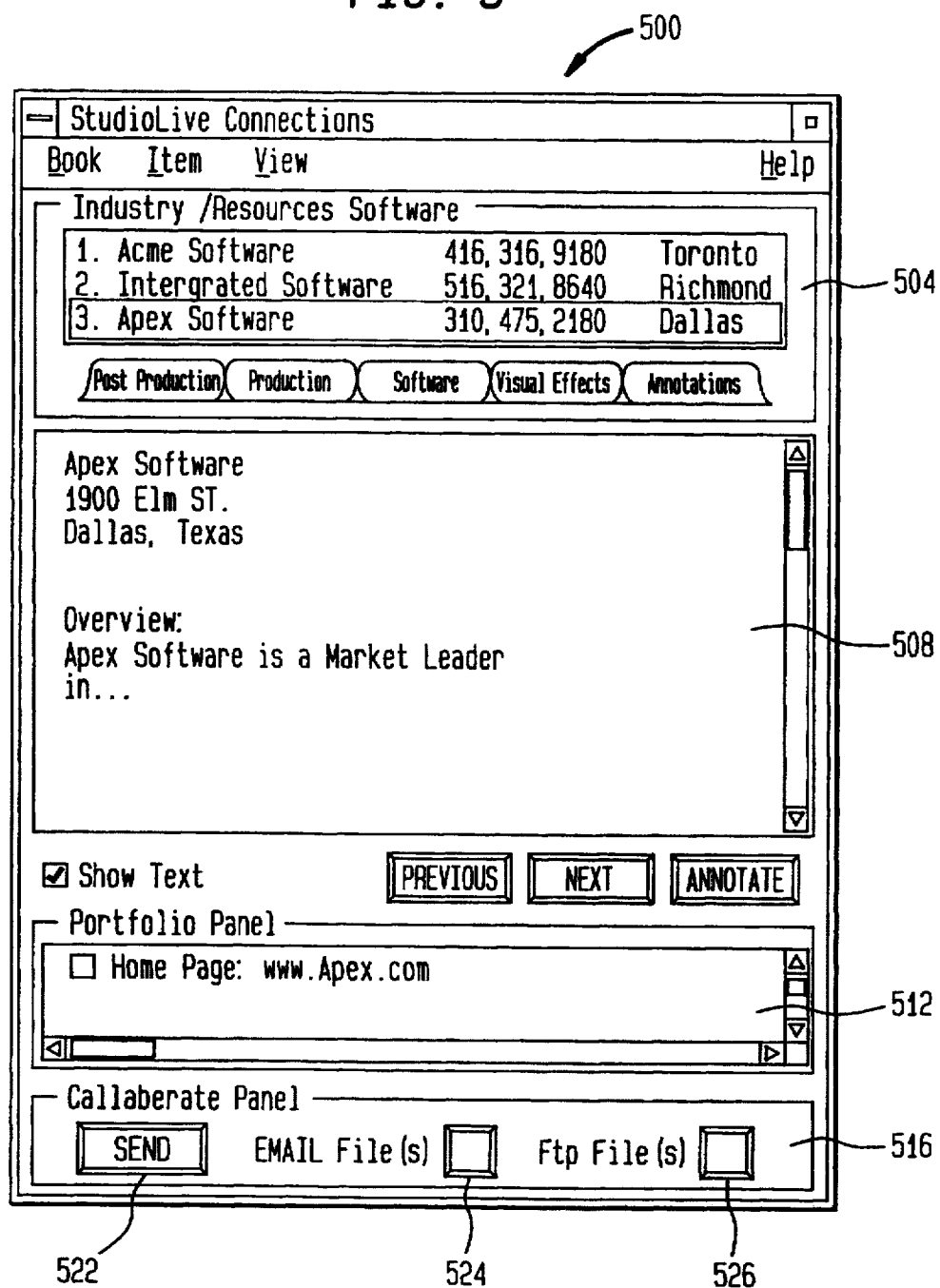
FIG. 5 is a diagram illustrating an example connections application.

In yet another example, the invention can be used in conjunction with a directory application such as Silicon Graphics' StudioLive® directory application, available from Silicon Graphics, Inc., in Mountain View, Calif., USA. FIG. 5 is a diagram illustrating an example connections window 500 for a directory application. Connections window 500 includes a directory portion 504, an information portion 508, a portfolio panel 512 and a collaborate panel 516.

Directory portion 504 provides user 104 with a listing of companies providing goods and/or services in particular areas. Because the StudioLive® application is directed toward the entertainment industry, the listings appearing in directory portion 504 are for companies providing goods and services in the entertainment industry. The textual listing for each company in directory portion 504 can itself be the icon for that company, or a separate graphical icon can be included with the text.

Information portion 508 provides detailed information about a selected company listed in directory portion 504. In the StudioLive® application, information portion is not interactive, but is instead simply provided for reference.

Portfolio panel 512 provides information on the selected company such as that company's e-mail address. Unlike information portion 508, in the StudioLive® version of the application portfolio panel 512 is an interactive portion of the connections window 500. Portfolio panel 512 provides links for obtaining additional information, such as hypertext links. For example, clicking on the home page portion of a company's information accesses that company's home page.

Collaborate panel 516 provides user 104 with a graphical interface that operates in conjunction with the present invention. In the illustrated example, collaborate panel 516 includes a send button 522, an e-mail file box 524, and an FTP file drop box 526. In this example, if user 104 wishes to send a file to a company listed in directory portion 504, user 104 selects (clicks on) the desired company and drags and drops the file icon into one of the two drop boxes 524, 526. User 104 then clicks the send button 522 to send the selected file to the selected company. For example, if user 104 wants to send a file using FTP, user 104 simply drags and drops the file icon onto drop box 526.

Note that it is not necessary for collaborate panel 516 to be customized to include the drop boxes 524, 526. As with other applications, the invention can be invoked by user 104 simply dragging and dropping a file onto the icon (graphical or textual) in directory portion 504 representing the desired recipient company.

The invention may be implemented using hardware, software or a combination thereof and may be implemented in a computer system or other processing system. In fact, in one embodiment, the invention is directed toward a software and/or hardware embodiment in a computer system implemented as a terminal 108. An example computer system 602 is shown in FIG. 6. The computer system 602 includes one or more processors, such as processor 604. The processor 604 is connected to a communication bus 606. Various software embodiments are described in terms of this example computer system. After reading this description, it will become apparent to a person skilled in the relevant art how to implement the invention using other computer systems and/or computer architectures.

Computer system 602 also includes a main memory 608, preferably random access memory (RAM), and can also include a secondary memory or secondary storage 610. The secondary memory 610 can include, for example, a hard disk drive 612 and a removable storage drive 614, representing a floppy disk drive, a magnetic tape drive, an optical disk drive, etc. The removable storage drive 614 reads from and/or writes to a removable storage unit 618 in a well known manner. Removable storage unit 618, represents a floppy disk, magnetic tape, optical disk, etc. which is read by and written to by removable storage drive 614. As will be appreciated, the removable storage unit 618 includes a computer usable storage medium having stored therein computer software and data.

In alternative embodiments, secondary memory 610 may include other similar means for allowing computer software and data to be loaded into computer system 602. Such means can include, for example, a removable storage unit 622 and an interface 620. Examples of such can include a program cartridge and cartridge interface (such as that found in video game devices), a removable memory chip (such as an EPROM, or PROM) and associated socket, and other removable storage units 622 and interfaces 620 which allow software and data to be transferred from the removable storage unit 618 to computer system 602.

Computer system 602 can also include a communications interface 624. Communications interface 624 allows software and data to be transferred between computer system 602 and external devices. Examples of communications interface 624 can include a modem, a network interface (such as an Ethernet card), a communications port, a PCMCIA slot and card, etc. Software and data transferred via communications interface 624 are in the form of signals 626 which can be electronic, electromagnetic, optical or other signals capable of being received by communications interface 624. These signals 626 are provided to communications interface via a channel 628. This channel 628 carries signals 626 and can be implemented using wire or cable, fiber optics, a phone line, a cellular phone link, an RF link and other communications channels.

In this document, the terms "computer program medium" and "computer usable medium" are used to generally refer to media such as removable storage device 618, a hard disk installed in hard disk drive 612, and signals 626. These computer program products are means for providing software (e.g., computer programs) to computer system 602.

Computer programs (also called computer control logic) are generally stored in main memory 608 and/or secondary memory 610 and executed therefrom. Computer programs can also be received via communications interface 624. Such computer programs, when executed, enable the computer system 602 to perform the features of the present invention as discussed herein. In particular, the computer programs, when executed, enable the processor 604 to perform the features of the present invention. Accordingly, such computer programs represent controllers of the computer system 602.

In an embodiment where the invention is implement using software, the software may be stored in a computer program product and loaded into computer system 602 using removable storage drive 614, hard drive 612 or communications interface 624. The control logic (software), when executed by the processor 604, causes the processor 604 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

6. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

I claim:

1. A system for implementing an electronic file transfer using an iconic drag and drop interface, where a sending user drags a first icon representing a file to be sent to a recipient onto a second icon representing the recipient, the system comprising:

means for capturing recipient information from the second icon when the sending user drags and drops the first icon onto the second icon, wherein said captured recipient information indicates a destination address to which the file is to be transferred;

means for automatically establishing a communications session between the sending user and the recipient, said communications session established using the recipient information; and means for transferring the file to the recipient via the established communications session using a transfer protocol.

2. The system of claim 1, further comprising means for sending a notification to the recipient regarding the file transfer.

3. The system of claim 2, wherein said means for sending a notification to the recipient comprises means for sending an e-mail message to the recipient notifying the recipient of the transfer.

4. The system of claim 1, further comprising means for prompting the sending user for additional inputs concerning the file transfer.

5. The system of claim 4, wherein said means for prompting comprises:

means for providing the sending user with a pop-up window comprising fields displaying parameters for the transfer determined by information captured by said means for capturing; and means for accepting user inputs to said pop-up window, said user inputs for modifying said parameters for the transfer.

6. The system of claim 5, wherein said pop-up window fields comprise:

a recipient identification;

a recipient address;

an identification of the file to be transferred; and a specified directory in a file space of the recipient, wherein the file is to be transferred to the specified directory.

7. The system of claim 6, further comprising means for sending an e-mail message to the recipient notifying the recipient of the transfer and said pop-up window fields further comprise an e-mail address field of the recipient.

8. The system of claim 1, wherein said means for automatically establishing a communications session comprises means for automatically establishing a File Transfer Protocol (FTP) session between the sending user and the recipient, said FTP session established using the recipient information; and wherein said means for transferring the file comprises means for transferring the file to the recipient via the established FTP session using File Transfer Protocol.

9. The system of claim 1, further comprising:

means for permitting the sending user to use a pop-up window to specify a directory in a file space of the recipient; and means for transferring the file to said specified directory via the established communications session.

10. A method for electronic file transfer using an iconic drag and drop interface, where a sending user drags a first icon representing a file to be sent to a recipient onto a second icon representing the recipient, the method comprising the steps of:

capturing recipient information from the second icon when the sending user drags and drops the first icon onto the second icon, wherein said captured recipient information indicates a destination address to which the file is to be transferred;

automatically establishing a communications session between the sending user and the recipient, said communications session established using the recipient information; and transferring the file to the recipient via the established communications session using a transfer protocol.

11. The method of claim 10, further comprising the step of sending a notification to the recipient regarding the file transfer.

12. The method of claim 11, wherein said step of sending a notification to the recipient comprises the step of sending an e-mail message to the recipient notifying the recipient of the transfer.

13. The method of claim 10, further comprising a step of prompting the sending user for additional inputs concerning the file transfer.

14. The method of claim 13, wherein said step of prompting the user comprises the steps of:

provide the sending user with a pop-up window comprising fields displaying parameters for the transfer determined by information captured; and accepting user inputs to said pop-up window, said user inputs for modifying said parameters for the transfer.

15. The method of claim 10, wherein said step of automatically establishing a communications session comprises automatically establishing a File Transfer Protocol (FTP) session between the sending user and the recipient, said FTP session established using the recipient information; and wherein said step of transferring the file comprises transferring the file to the recipient via the established FTP session using File Transfer Protocol.

16. The method of claim 10, further comprising the steps of:

permitting the sending user to use a pop-up window to specify a directory in a file space of the recipient; and transferring the file to said specified directory via the established communications session.

17. A computer program product for use with a computer system, said computer program product comprising:

a computer usable medium having computer readable program code means embodied in said medium for causing the computer system to transfer a file electronically in response to an iconic drag and drop user interface, said computer readable program code means comprising:

computer readable program code means for capturing recipient information from the second icon when the sending user drags and drops the first icon onto the second icon, wherein said captured recipient information indicates a destination address to which the file is to be transferred;

computer readable program code means for automatically establishing a communications session between the sending user and the recipient, said communications session established using the recipient information; and computer readable program code means for transferring the file to the recipient via the established communications session using a transfer protocol.

18. The computer program product of claim 17, wherein said computer readable program code means further comprises computer readable program code means for sending a notification to the recipient regarding the file transfer.

19. The computer program product of claim 18, wherein said computer readable program code means for sending a notification to the recipient comprises computer readable program code means for sending an e-mail message to the recipient notifying the recipient of the transfer.

20. The computer program product of claim 17, wherein said computer readable program code means further comprising computer readable program code means for prompting the sending user for additional inputs concerning the file transfer.

21. The computer program product of claim 20, wherein said computer readable program code means for prompting comprises:

computer readable program code means for providing the sending user with a pop-up window comprising fields displaying parameters for the transfer determined by information captured by said means for capturing; and computer readable program code means for accepting user inputs to said pop-up window, said user inputs for modifying said parameters for the transfer.

22. The computer program product of claim 17, wherein said computer readable program code means for automatically establishing a communications session comprises computer readable program code means for automatically establishing a File Transfer Protocol (FTP) session between the sending user and the recipient, said FTP session established using the recipient information; and wherein said computer readable program code means for transferring the file comprises computer program code means for transferring the file to the recipient via the established FTP session using File Transfer Protocol.

23. The computer program product of claim 17, further comprises:

computer readable program code means for permitting the sending user to use a pop-up window to specify a directory in a file space of the recipient; and computer readable program code means for transferring the file to said specified directory via the established communications session.

24. A computer program medium readable by a machine, tangibly embodying a program of instructions executable by the machine to perform method steps for transferring a file from a sending user to a recipient in response to the sending user dragging and dropping a first icon representing a file to be sent to a recipient onto a second icon representing the recipient, said method steps comprising the steps of:

capturing recipient information from the second icon when the sending user drags and drops the first icon onto the second icon, wherein said captured recipient information indicates a destination address to which the file is to be transferred;

automatically establishing a communications session between the sending user and the recipient, said communications session established using the recipient information; and transferring the file to the recipient via the established communications session using a transfer protocol.

25. The computer readable medium of claim 24, wherein said method steps further comprise a step of sending a notification to the recipient regarding the file transfer.

26. The computer readable medium of claim 25, wherein said step of sending a notification to the recipient comprises the step of sending an e-mail message to the recipient notifying the recipient of the transfer.

27. The computer readable medium of claim 24, wherein said method steps further comprise a step of prompting the sending user for additional inputs concerning the file transfer.

28. The computer readable medium of claim 27, wherein said step of prompting the user comprises the steps of:

providing the sending user with a pop-up window comprising fields displaying parameters for the transfer determined by information captured; and accepting user inputs to said pop-up window, said user inputs for modifying said parameters for the transfer.

29. The computer program medium of claim 24, wherein said step of automatically establishing a communications session comprises automatically establishing a File Transfer Protocol (FTP) session between the sending user and the recipient, said (FTP) session established using the recipient information; and wherein said step of transferring the file comprises transferring the file to the recipient via the established FTP session using File Transfer Protocol.

30. The computer program medium of claim 24, further comprising the steps of:

permitting the sending user to use a pop-up window to specify a directory in a file space of the recipient; and transferring the file to said specified directory via the established communications session.

* * * * *